US010985353B2

(12) United States Patent
Abusleme et al.

(10) Patent No.: US 10,985,353 B2
(45) Date of Patent: Apr. 20, 2021

(54) SECONDARY BATTERIES

(75) Inventors: Julio A. Abusleme, Saronno (IT); Regis Faig, Baverans (FR); Riccardo Pieri, Milan (IT)

(73) Assignee: SOLVAY SPECIALTY POLYMERS ITALY S.P.A., Bollate (IT)

(*) Notice: Subject to any disclaimer, the term of this patent is extended or adjusted under 35 U.S.C. 154(b) by 1 day.

(21) Appl. No.: 14/127,371

(22) PCT Filed: Jun. 15, 2012

(86) PCT No.: PCT/EP2012/061423
§ 371 (c)(1),
(2), (4) Date: Dec. 18, 2013

(87) PCT Pub. No.: WO2012/175417
PCT Pub. Date: Dec. 27, 2012

(65) Prior Publication Data
US 2014/0120426 A1    May 1, 2014

(30) Foreign Application Priority Data

Jun. 23, 2011 (EP) .................................. 11305799

(51) Int. Cl.
| | | |
|---|---|---|
| H01M 2/16 | (2006.01) | |
| H01M 10/0565 | (2010.01) | |
| H01M 6/06 | (2006.01) | |
| H01M 4/62 | (2006.01) | |
| C09D 127/16 | (2006.01) | |
| C08L 27/16 | (2006.01) | |

(52) U.S. Cl.
CPC ............ *H01M 2/162* (2013.01); *C08L 27/16* (2013.01); *C09D 127/16* (2013.01); *H01M 2/1653* (2013.01); *H01M 4/623* (2013.01); *H01M 6/06* (2013.01); *H01M 10/0565* (2013.01); *H01M 2300/0085* (2013.01)

(58) Field of Classification Search
CPC ............ H01M 2/162; H01M 10/0565; H01M 2300/0085; H01M 2/16
USPC ....................................................... 429/254
See application file for complete search history.

(56) References Cited

U.S. PATENT DOCUMENTS

| | | | |
|---|---|---|---|
| 6,203,944 B1 | 3/2001 | Turner et al. | |
| 6,409,867 B1 | 6/2002 | Kronfli et al. | |
| 6,468,698 B1 | 10/2002 | Hamano et al. | |
| 6,506,523 B1 | 1/2003 | Hatazawa et al. | |
| 9,159,979 B2 | 10/2015 | Weber et al. | |
| 2002/0197536 A1 | 12/2002 | Mori et al. | |
| 2003/0017386 A1* | 1/2003 | Daido | H01M 2/14 429/142 |
| 2006/0047095 A1 | 3/2006 | Pacetti | |

FOREIGN PATENT DOCUMENTS

| | | |
|---|---|---|
| CN | 1266540 A | 9/2000 |
| CN | 101851314 A | 10/2010 |
| EP | 1621573 A1 | 2/2006 |
| JP | 2000215917 A | 8/2000 |
| JP | 2009038020 A | 2/2009 |
| JP | 2010061930 A | 3/2010 |
| KR | 20100119888 A | 11/2010 |
| WO | 8302368 A1 | 7/1983 |
| WO | 0003444 A1 | 1/2000 |
| WO | 2008129041 A1 | 10/2008 |

OTHER PUBLICATIONS

Kim, Yong Woo et al., "Anhydrous proton conducting membranes based on crosslinked graft copolymer electrolytes", Journal of Membrane Science, 2008, 325(1), p. 319-325—Elsevier B.V.
Office Action issued in corresponding Korean Patent Application No. 10-2014-7000531; dated Dec. 24, 2018 (6 pages).

* cited by examiner

*Primary Examiner* — Doris L Lee
(74) *Attorney, Agent, or Firm* — Osha Bergman Watanabe & Burton LLP

(57) ABSTRACT

The present invention pertains to a secondary battery comprising at least one separator, said separator comprising at least one fluorinated polymer [polymer (F)], said polymer (F) comprising recurring units derived from vinylidene fluoride (VDF), hexafluoropropylene (HFP) and at least one (meth)acrylic monomer (MA) having formula (I) here below, wherein: —$R_1$, $R_2$ and $R_3$, equal to or different from each other, are independently selected from a hydrogen atom and a $C_1$-$C_3$ hydrocarbon group, and —$R_{OH}$ is a $C_1$-$C_5$ hydrocarbon moiety comprising at least one hydroxyl group.

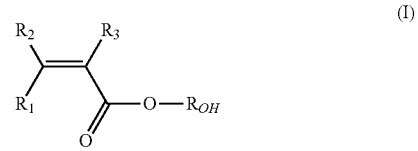

(I)

9 Claims, No Drawings

SECONDARY BATTERIES

CROSS-REFERENCE TO RELATED APPLICATIONS

This application is a U.S. national stage entry under 35 U.S.C. § 371 of International Application No. PCT/EP2012/061423 filed Jun. 15, 2012, which claims priority to European Application No. 11305799.6 filed Jun. 23, 2011. The entire contents of these applications are explicitly incorporated herein by this reference.

TECHNICAL FIELD

The present invention pertains to a secondary battery comprising a vinylidene fluoride polymer separator. More particularly, the invention pertains to a Lithium-ion secondary battery comprising a vinylidene fluoride polymer separator.

BACKGROUND ART

The battery industry has seen an enormous growth in the past years in rechargeable secondary batteries due to the widespread use of portable electronic devices and telecommunications equipments such as cell phones, personal digital assistants (PDA's), laptop computers and other wireless electronics.

The continued growth in Lithium-ion battery market in particular has led to a strong demand for battery separators. A variety of separators have been used in batteries over the years. Their main function is to prevent electronic contact, while enabling ionic transport between the positive and negative electrodes of electrochemical cells.

Although the material of a battery separator is inert and does not influence electrical energy storage or output, its physical properties greatly influence the performance and safety of the battery.

The most commonly used separators for secondary batteries are either porous separators made of microporous polymeric films or of non-woven fabrics or dense separators made of polymeric electrolytes.

Microporous separators for secondary batteries are commonly fabricated from polymeric films made of polyolefins (e.g. polyethylene, polypropylene and laminates thereof) and polyvinylidene fluoride (PVDF).

Materials typically used in non-woven fabrics include, notably, polyolefins such as polyethylene, polypropylene, polyamide, polyvinyl chloride, polytetrafluoroethylene and polyvinylidene fluoride (PVDF).

Among polymeric electrolytes particularly suitable for use in secondary batteries, electrolytes have been proposed wherein a polymer matrix is swollen with a liquid electrolyte.

For instance, US 2002/0197536 (SAMSUNG SDI CO. LTD.) 26 Dec. 2002 discloses a polymeric electrolyte for use in Lithium batteries comprising a vinylidene fluoride-hexafluoropropylene copolymer or a copolymer further comprising recurring units of at least one compound selected from the group consisting of acrylic acid and maleic acid monoalkylester.

Nevertheless, as there is an increasing demand for secondary batteries complying with huge performance and safety requirements, secondary batteries need to be designed and constructed which are resistant to typical abuse conditions such as internal shorting, overcharge, overdischarge, vibration, shock and temperature variations.

An abnormal increase in the temperature of the battery can occur from internal heating caused by either electrical abuse (e.g. overcharge or short circuit) or mechanical abuse (e.g. nail penetration or crush) or could also be a result of external heating.

The greater the mechanical integrity of the separator above about 130° C., the greater the margin of safety the separator can provide. If the separator loses its mechanical integrity, then the electrodes can come into direct contact, react chemically and result in thermal runaway. The high-temperature melt integrity of the separator is indeed a very important property to keep the battery safe during extended overcharge or during extended exposure to higher temperatures.

There is thus still a need in the art for separators endowed with outstanding thermal stability properties while maintaining good ionic conductivity values to be suitable for the manufacture of secondary batteries.

SUMMARY OF INVENTION

It is thus an object of the present invention a secondary battery comprising at least one separator, said separator comprising at least one fluorinated polymer [polymer (F)], said polymer (F) comprising recurring units derived from vinylidene fluoride (VDF), hexafluoropropylene (HFP) and at least one (meth)acrylic monomer (MA) having formula (I) here below:

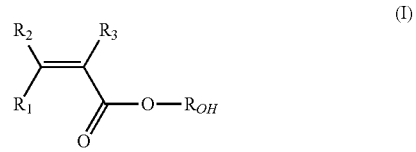

wherein:
R$_1$, R$_2$ and R$_3$, equal to or different from each other, are independently selected from a hydrogen atom and a C$_1$-C$_3$ hydrocarbon group, and
R$_{OH}$ is a C$_1$-C$_5$ hydrocarbon moiety comprising at least one hydroxyl group.

The Applicant has surprisingly found that by appropriate selection of the vinylidene fluoride (VDF) polymer, it is advantageously possible to obtain separators which successfully exhibit outstanding thermal stability properties while retaining good ionic conductivity values so as to enable manufacturing secondary batteries complying with performance and safety requirements.

The secondary battery of the invention typically further comprises the following components:
a negative electrode comprising at least one metal;
a charge-carrying electrolyte comprising a charge carrying medium and at least one metal salt; and
a positive electrode.

The separator according to the invention is commonly located between positive and negative electrodes of the secondary battery.

For the purpose of the present invention, the term "separator" is intended to denote a discrete, generally thin, interface which moderates permeation of chemical species in contact with it. This interface may be homogeneous, that is, completely uniform in structure (dense separator), or it may be chemically or physically heterogeneous, for example containing voids, pores or holes of finite dimensions (porous separator). The terms "pore", "void" and "hole" will be used as synonyms within the context of the present invention.

Porous separators are generally characterized by a porosity (c) and an average pore diameter (d), said porosity being a measure of the fraction of the volume of the separator which is porous.

According to a first embodiment of the invention, the secondary battery comprises at least one porous separator, said separator comprising at least one fluorinated polymer [polymer (F)] as defined above.

The porous separator according to this first embodiment has a porosity (c) of advantageously at least 5%, preferably at least 10%, more preferably at least 20% and advantageously of at most 90%, preferably at most 80%.

The porous separator according to this first embodiment of the invention has an average pore diameter (d) of advantageously at least 0.01 μm, preferably at least 0.05 μm, more preferably at least 0.1 μm and advantageously of at most 30 μm, preferably at most 10 μm.

The porous separator according to this first embodiment of the invention is preferably a microporous flat-sheet membrane or a non-woven cloth.

The microporous flat-sheet membrane has a thickness usually of about 25 μm or less, a porosity usually ranging between 40% and 70% and an average pore diameter usually ranging from 0.01 μm to 1 μm.

The non-woven cloth is typically a felt or mat wherein fibers are randomly laid down to form numerous voids, said felt or matt having a thickness usually ranging from 80 μm to 300 μm, a porosity usually ranging from 60% to 80% and an average pore diameter usually ranging from 10 μm to 50 μm.

The microporous membrane is made typically either by a dry process or by a wet process. Both processes contain an extrusion step to produce a thin film and employ one or more orientation steps to generate pores. These processes are only applicable to molten or soluble polymers.

The dry process generally consists of the following steps: (1) extruding molten polymer to form a film, (2) annealing the film, and (3) stretching the film to generate pores, while the wet process consists of the following steps: (1) mixing with extractable additives to form a hot polymer solution, (2) extruding the hot solution to form a gel-like film, (3) extracting soluble additives out of the film to form porous structure. The membranes made by the dry process generally show distinct slit-pore microstructures, while the membranes made by the wet process exhibit interconnected spherical or elliptical pores. For the purpose of enhanced safety, two or more layers of membranes with different melting points can be laminated to make a thermal shutdown separator.

The non-woven cloth can be made through dry-laid process, wet-laid process, spun-bond process or melt-blown process. All these processes consist of the following steps: (1) making fabric webs, (2) bonding webs and (3) post-treatment, and in most cases the web making and bonding are done in one step. Among processes above, the wet-laid process has been widely used for the manufacture of battery separators.

According to a second embodiment of the invention, the secondary battery comprises at least one dense separator, said separator comprising at least one fluorinated polymer [polymer (F)] as defined above.

The dense separator according to this second embodiment of the invention is preferably a polymer electrolyte wherein at least one fluorinated polymer [polymer (F)] as defined above is swollen by a charge carrying medium as defined above.

Should the separator be a dense separator, it is made typically by casting and/or melt forming a film.

Casting generally involves solution casting, wherein typically a casting knife or draw-down bar is used to spread an even film of an appropriate solution of polymer in a suitable liquid medium across a suitable support. After the casting has been made, the liquid generally evaporates to leave a uniform dense separator.

Melt forming is commonly used to make dense separators by film extrusion, preferably by flat cast film extrusion.

Selection of negative electrodes of the secondary battery of the invention will depends upon the nature of the secondary battery.

The secondary battery of the invention is preferably an alkaline or an alkaline-earth secondary battery.

Representative negative electrodes of alkaline or alkaline-earth secondary batteries notably include the followings:
  alkaline or alkaline-earth metal, including lithium, sodium, magnesium or calcium;
  graphitic carbons able to intercalate alkaline or alkaline-earth metal, typically existing in forms such as powders, flakes, fibers or spheres (for example, mesocarbon microbeads) hosting at least one alkaline or alkaline-earth metal;
  alkaline or alkaline-earth metal alloy compositions, including silicon-based alloys, germanium-based alloys;
  alkaline or alkaline-earth metal titanates, advantageously suitable for intercalating alkaline or alkaline-earth metal with no induced strain.

The secondary battery of the invention is more preferably a Lithium-ion secondary battery.

Representative negative electrodes of Lithium-ion secondary batteries notably include the followings:
  graphitic carbons able to intercalate lithium, typically existing in forms such as powders, flakes, fibers or spheres (for example, mesocarbon microbeads) hosting lithium;
  lithium metal;
  lithium alloy compositions, including notably those described in U.S. Pat. No. 6,203,944 (3M INNOVATIVE PROPERTIES CO.) 20 Mar. 2001 and/or in WO 00/03444 (MINNESOTA MINING AND MANUFACTURING) 20 Jan. 2000;
  lithium titanates, generally represented by formula $Li_4Ti_5O_{12}$; these compounds are generally considered as "zero-strain" insertion materials, having low level of physical expansion upon taking up the mobile ions, i.e. $Li^+$;
  lithium-silicon alloys, generally known as lithium silicides with high Li/Si ratios, in particular lithium silicides of formula $Li_{4.4}Si$;
  lithium-germanium alloys, including crystalline phases of formula $Li_{4.4}Ge$.

The negative electrode may contain additives as will be familiar to those skilled in the art. Among them, mention can be made notably of carbon black, graphene or carbon nanotubes.

As will be appreciated by those skilled in the art, the negative electrode or anode may be in any convenient form including foils, plates, rods, pastes or as a composite made by forming a coating of the negative electrode material on a conductive current collector or other suitable support.

The charge-carrying electrolyte comprising a charge carrying medium and a metal salt advantageously provides a charge-carrying pathway between the positive and negative electrodes, and generally initially contains at least the charge carrying media and the metal salt.

The electrolyte may include other additives that will be familiar to those skilled in the art. As will be appreciated by those skilled in the art, the electrolyte may be in any convenient form including liquids and gels.

A variety of charge carrying media may be employed in the electrolyte. Exemplary media are liquids or gels (e.g. solvating polymers such as poly(oxyethylene)) capable of solubilising sufficient quantities of metal salt and, optionally, other ingredients or additives, so that a suitable quantity of charge can be transported between the positive electrode and the negative electrode.

Exemplary charge carrying media can be used over a wide temperature range, for example, from about −30° C. to about 70° C. without freezing or boiling, and are stable in the electrochemical window within which the cell electrodes operate.

Representative charge carrying media include ethylene carbonate, propylene carbonate, dimethyl carbonate, diethyl carbonate, ethyl-methyl carbonate, butylene carbonate, vinylene carbonate, fluoroethylene carbonate, fluoropropylene carbonate, gamma-butyrolactone, methyl difluoroacetate, ethyl difluoroacetate, dimethoxyethane, diglyme (bis(2-methoxyethyl)ether), non-protonic ionic liquids, poly(oxyethylene)s and combinations thereof.

A variety of metal salts may be employed in the electrolyte. Metal salts which are stable and soluble in the chosen charge-carrying media will be generally selected for the metal-ion cell of the invention.

Metal salts suitable for the metal-ion cell of the invention are notably $M(PF_6)_n$, $M(BF_4)_n$, $M(ClO_4)_n$, $M(bis(oxalato)borate)_n$ ("$M(BOB)_n$"), $M[N(CF_3SO_2)_2]_n$, $M[N(C_2F_5SO_2)_2]_n$, $M[N(CF_3SO_2)(R_FSO_2)]_n$ with $R_F$ being $C_2F_5$, $C_4F_9$, $CF_3OCF_2CF_2$, $M(AsF_6)_n$, $M[C(CF_3SO_2)_3]_n$, with M being a metal, preferably a transition metal, an alkaline metal or an alkaline-earth metal, more preferably M=Li, Na, K, Cs, and n is the valence of said metal, typically n=1 or 2.

Among preferred lithium salts for Lithium-ion cells, mention can be made of $LiPF_6$, $LiBF_4$, $LiClO_4$, lithium bis(oxalato)borate ("LiBOB"), $LiN(CF_3SO_2)_2$, $LiN(C_2F_5SO_2)_2$, $M[N(CF_3SO_2)(R_FSO_2)]_n$ with $R_F$ being $C_2F_5$, $C_4F_9$, $CF_3OCF_2CF_2$, $LiAsF_6$, $LiC(CF_3SO_2)_3$ and combinations thereof.

The electrolyte can also conveniently contain at least one redox chemical shuttle. The electrolyte may however be formulated without dissolved redox chemical shuttle. The expression "redox chemical shuttle" refers to an electrochemically reversible compound that during charging of a Lithium-ion cell can become oxidized at the positive electrode once the charging potential reaches a desired value, can migrate to the negative electrode, can become reduced at the negative electrode to reform the unoxidized (or less oxidized) shuttle species, and can migrate back to the positive electrode.

The positive electrode of the secondary battery of the invention may comprise inorganic metal oxides or organic polymers.

Representative examples of organic polymers suitable for the manufacture of the positive electrodes of the secondary battery of the invention notably include fused 6,6,6-membered ring system polymers fabricated with diradicals of thianthrenes, phenoxatiins, phenoxazine, N-alkylphenotiazine dihydrophenazine, dialkyldihydrophenazine, dibenzodioxin, their substituted derivatives and mixtures thereof, as described in WO 83/02368 (CHEVRON RESEARCH COMPANY) 7 Jul. 1983.

The fluorinated polymer [polymer (F)] of the separator of the secondary battery of the invention comprises typically from 0.5% to 10% by moles, preferably from 1% to 5% by moles, more preferably from 1.5% to 3.5% by moles of recurring units derived from hexafluoropropylene (HFP).

The fluorinated polymer [polymer (F)] of the separator of the secondary battery of the invention comprises typically from 0.1% to 5% by moles of recurring units derived from at least one (meth)acrylic monomer (MA) having formula (I) as described above.

The polymer (F) comprises preferably at least 0.3% by moles, more preferably at least 0.5% by moles of recurring units derived from at least one (meth)acrylic monomer (MA) having formula (I) as described above.

The polymer (F) comprises preferably at most 3% by moles, more preferably at most 1.5% by moles of recurring units derived from at least one (meth)acrylic monomer (MA) having formula (I) as described above.

The (meth)acrylic monomer (MA) of the polymer (F) preferably complies with formula (II) here below:

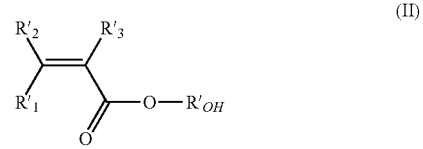

wherein:

$R'_1$, $R'_2$ and $R'_3$ are hydrogen atoms, and $R'_{OH}$ is a $C_1$-$C_5$ hydrocarbon moiety comprising at least one hydroxyl group.

Non-limitative examples of (meth)acrylic monomers (MA) include, notably, hydroxyethyl(meth)acrylate, hydroxypropyl(meth)acrylate, hydroxyethylhexyl(meth)acrylate.

The monomer (MA) is more preferably selected from the followings:

hydroxyethyl acrylate (HEA) of formula:

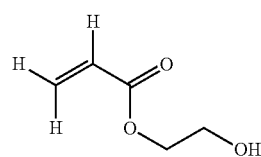

2-hydroxypropyl acrylate (HPA) of either of formulae:

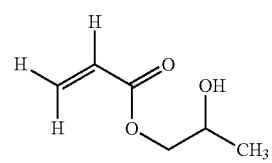

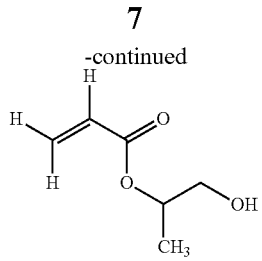

and mixtures thereof.

The monomer (MA) is even more preferably hydroxyethyl acrylate (HEA).

The polymer (F) of the separator of the secondary battery of the invention may further comprise recurring units derived from at least one other comonomer [comonomer (C)].

The comonomer (C) can be either a hydrogenated comonomer [comonomer (H)] or a fluorinated comonomer [comonomer (F)].

By the term "hydrogenated comonomer [comonomer (H)]", it is hereby intended to denote an ethylenically unsaturated comonomer free of fluorine atoms.

Non-limitative examples of suitable hydrogenated comonomers (H) include, notably, ethylene, propylene, vinyl monomers such as vinyl acetate.

By the term "fluorinated comonomer [comonomer (F)]", it is hereby intended to denote an ethylenically unsaturated comonomer comprising at least one fluorine atom.

Non-limitative examples of suitable fluorinated comonomers (F) include, notably, tetrafluoroethylene (TFE), trifluoroethylene (TrFE), chlorotrifluoroethylene (CTFE) and vinyl fluoride.

Should the comonomer (C) be present, the polymer (F) of the separator of the secondary battery of the invention comprises typically from 1% to 10% by moles, preferably from 2% to 5% by moles of recurring units derived from said comonomer (C).

The polymer (F) of the secondary battery of the invention is preferably a fluorinated polymer [polymer ($F_1$)] comprising:
from 1.5% to 3.5% by moles of recurring units derived from hexafluoropropylene (HFP), and
from 0.5% to 1.5% by moles of recurring units derived from at least one (meth)acrylic monomer (MA) having formula (I) as described above,
wherein the recurring units derived from vinylidene fluoride (VDF) are the complement to 100% by moles of total recurring units.

The polymer (F) of the secondary battery of the invention is more preferably a fluorinated polymer [polymer ($F_2$)] comprising:
from 1.5% to 3.5% by moles of recurring units derived from hexafluoropropylene (HFP), and
from 0.5% to 1.5% by moles of recurring units derived from hydroxyethyl acrylate (HEA),
wherein the recurring units derived from vinylidene fluoride (VDF) are the complement to 100% by moles of total recurring units.

The polymer (F) of the secondary battery of the invention is more preferably a fluorinated polymer [polymer ($F_3$)] consisting of:
from 1.5% to 3.5% by moles of recurring units derived from hexafluoropropylene (HFP), and
from 0.5% to 1.5% by moles of recurring units derived from hydroxyethyl acrylate (HEA),
wherein the recurring units derived from vinylidene fluoride (VDF) are the complement to 100% by moles of total recurring units.

The polymer (F) of the separator of the secondary battery of the invention can be manufactured by aqueous suspension polymerization or by aqueous emulsion polymerization processes. The polymer (F) of the separator of the secondary battery of the invention is preferably manufactured by an aqueous suspension polymerization process as described in WO 2008/129041 (SOLVAY SOLEXIS S.P.A.) 30 Oct. 2008.

Should the disclosure of any patents, patent applications, and publications which are incorporated herein by reference conflict with the description of the present application to the extent that it may render a term unclear, the present description shall take precedence.

The invention will be now described in more detail with reference to the following examples whose purpose is merely illustrative and not limitative of the scope of the invention.

EXAMPLE 1

Preparation of VDF/HFP/HEA Polymer

In a 4 lt. reactor equipped with an impeller running at a speed of 880 rpm were introduced in sequence 2455 g of demineralized water and 0.63 g of METHOCEL® K100 GR suspending agent.

The reactor was vented and pressurized with nitrogen to 1 bar, then 8.55 g of a 75% by volume solution of t-amyl perpivalate initiator in isododecane were introduced into the reactor, followed by 107 g of HFP monomer and 947 g of VDF monomer. The reactor was then gradually heated to 52° C. to a final pressure of 110 bar. Temperature was maintained constant at 55° C. throughout the whole trial. Pressure was maintained constant at 110 bar throughout the whole trial by feeding a 19.96 g/l aqueous solution of HEA monomer to a total of 709 ml. After 510 minutes the polymerization run was stopped by degassing the suspension until reaching atmospheric pressure. The polymer so obtained was then recovered, washed with demineralised water and oven-dried at 50° C. (814 g). The polymer so obtained contained 2.3% by moles of HFP and 1.0% by moles of HEA, as determined by NMR.

COMPARATIVE EXAMPLE 1

Preparation of VDF/HFP/Acrylic Acid (AA) Polymer

In a 4 lt. reactor equipped with an impeller running at a speed of 880 rpm were introduced in sequence 2460 g of demineralized water and 0.63 g of METHOCEL® K100 GR suspending agent.

The reactor was vented and pressurized with nitrogen to 1 bar, then 9.98 g of a 75% by volume solution of t-amyl perpivalate initiator in isododecane and 5.35 g of diethyl carbonate were introduced into the reactor, followed by 0.5 g of acrylic acid (AA) monomer, 107 g of HFP monomer and 949 g of VDF monomer. The reactor was then gradually heated to 55° C. to a final pressure of 110 bar. Temperature was maintained constant at 55° C. throughout the whole trial. Pressure was maintained constant at 110 bar throughout the whole trial by feeding a 17.44 g/l aqueous solution of AA monomer to a total of 750 ml. After 516 minutes the polymerization run was stopped by degassing the suspension until reaching atmospheric pressure. The polymer so obtained was then recovered, washed with demineralised water and oven-dried at 50° C. (852 g).

The polymer so obtained contained 2.5% by moles of HFP and 1.0% by moles of AA, as determined by NMR.

Determination of Ionic Conductivity

Films of polymers were dipped in an electrolyte solution of $LiPF_6$ 1M in ethylene carbonate/propylene carbonate (1:1 weight ratio) and stored at room temperature in a dry glove-box for 24 hours. The resulting polymer electrolyte was put between two stainless steel electrodes and sealed in a container.

The resistance of the polymer electrolyte was measured and the ionic conductivity ([σ]) was calculated using the following equation:

$$[\sigma] = \frac{d}{(R_b \times S)}$$

wherein d is the thickness of the film, $R_b$ is the bulk resistance and S is the area of the stainless steel electrode.

General Procedure for the Manufacture of Dense Separators on Pilot Scale

Polymer powder was processed by extrusion in a LEISTRITZ LSM 30/34 twin-screw extruder, equipped with 6 temperature zones and a 4 mm-2 holes die.

Temperature set points were set as detailed in Table 1 here below:

TABLE 1

| Feed zone | T1 | T2 | T3 | T4 | T5 |
|---|---|---|---|---|---|
| 140° C. | 145° C. | 150° C. | 155° C. | 155° C. | 165° C. |

Screws speed was set at 100 rpm with a feed rate of 15%. Extruded strands were cooled in a water bath, dried, calibrated and cut in a pelletizer.

Dense separators were manufactured from the pellets so obtained by flat cast film extrusion.

Flat Cast Film Extrusion

For manufacturing dense separators, pellets were processed in a single screw Braebender extruder (screw speed=25 rpm) equipped with 5 temperature zones, set at 200° C., and a 0.5 mm×100 mm tape die. Upon exit from the die, the molten tape was rolled onto two subsequent chill rolls kept at a temperature of 60° C., whose speed was adapted so as to obtain a film thickness of about 20-25 μm.

Thermal Aging

Dense separators obtained as detailed hereinabove were placed in an oven at 150° C. for 15 to 42 hours. To verify thermal stability of the separator, its transmittance value at 450 nm was measured before and after thermal aging using a UV/VIS spectrophotometer.

It has been found through observation of transmittance values at 450 nm that dense separators obtained from the VDF/HFP/HEA polymer prepared according to Example 1 of the invention show no degradation upon thermal aging at 150° C. for 15 to 42 hours (see Table 2 here below).

On the other hand, dense separators obtained from the VDF/HFP/AA polymer prepared according to comparative Example 1 do not withstand sustained thermal aging at 150° C. as shown by a significant decrease in transmittance values after 15 to 42 hours (see Table 2 here below).

In view of the above, dense separators obtained from the VDF/HFP/HEA polymer prepared according to Example 1 of the invention exhibit enhanced thermal stability properties as compared with dense separators obtained from the VDF/HFP/AA polymer prepared according to comparative Example 1.

TABLE 2

| | Transmittance [%, 450 nm] | | |
|---|---|---|---|
| | before thermal aging | after thermal aging 15 hours | after thermal aging 42 hours |
| Example 1 | 90.7% | 90.9% | 91.2% |
| C. Example 1 | 91.3% | 87.8% | 86.6% |

Moreover, dense separators obtained from the VDF/HFP/HEA polymer prepared according to Example 1 of the invention are advantageously uniform in structure after thermal aging at 150° C. for 15 to 42 hours as compared with dense separators obtained from the VDF/HFP/AA polymer prepared according to comparative Example 1, which undergo thermal degradation accompanied by a yellowing of the materials so obtained.

Further, dense separators obtained from the VDF/HFP/HEA polymer prepared according to Example 1 of the invention and from the VDF/HFP/AA polymer prepared according to comparative Example 1 were found to have advantageously both an ionic conductivity of about $10^{-5}$ S/cm as measured as detailed hereinabove.

General Procedure for the Manufacture of Dense Separators on Industrial Scale

Dense separators were also manufactured from pellets of polymers prepared according to Example 1 and comparative Example 1 by extrusion using a single screw extruder having a diameter of 45 mm, equipped with a film die having a lip length of 450 mm and a lip width of 0.55 mm and three calendering rolls.

Temperature profile was set as detailed in Table 3 here below:

TABLE 3

| Zone 1 (hopper) | 190° C. |
|---|---|
| Zone 2 (barrel) | 210° C. |
| Zone 3 (barrel) | 220° C. |
| Zone 4 (head) | 230° C. |
| Rolls | 75° C. |

Extrusion conditions were set as detailed in Table 4 here below:

TABLE 4

| Pressure [bar] | 37 |
|---|---|
| Melt temperature [° C.] | 270 |
| Throughput rate [Kg/h] | 4.3 |
| Screw speed [rpm] | 10 |
| Calendering rolls speed [m/min] | 3.7 |

It has been found that homogeneous large (450 mm) dense separators having a thickness of about 15 μm are advantageously obtained by extrusion of pellets of the VDF/HFP/HEA polymer prepared according to Example 1 of the invention following procedure as detailed hereinabove. On the other hand, the VDF/HFP/AA polymer prepared according to comparative Example 1 degraded during extrusion following procedure as detailed hereinabove so that no dense separator was obtained under this procedure.

It has been thus demonstrated that secondary batteries complying with performance and safety requirements were successfully obtained according to the present invention using polymer (F) separators, said separators being advantageously endowed with outstanding thermal stability properties while retaining good ionic conductivity values.

Also, separators having a length of up to 450 mm or more may be advantageously obtained by processing the polymer (F) according to the present invention, thus enabling manufacturing correspondingly large-sized secondary batteries.

The invention claimed is:

1. A secondary battery comprising at least one separator, said separator comprising at least one fluorinated polymer [polymer (F)], said polymer (F) comprising recurring units derived from vinylidene fluoride (VDF), from 1.5% to 3.5% by moles of recurring units derived from hexafluoropropylene (HFP) and from 0.5% to 1.5% by moles of recurring units derived from hydroxyethyl acrylate (HEA) wherein the recurring units derived from vinylidene fluoride (VDF) are the complement to 100% by moles of total recurring units.

2. The secondary battery according to claim 1, said battery being an alkaline or alkaline-earth secondary battery.

3. The secondary battery according to claim 1, said battery being a Lithium-ion secondary battery.

4. The secondary battery according to claim 1, wherein the polymer (F) further comprises from 1% to 10% by moles of recurring units derived from at least one other hydrogenated comonomer [comonomer (H)] or at least one other fluorinated comonomer [comonomer (F)] or both.

5. The secondary battery according to claim 1, wherein polymer (F) comprises recurring units derived from vinylidene fluoride, 2.3% by moles of recurring units derived from hexafluoropropylene and 1.0% by moles of recurring units derived from hydroxyethyl acrylate wherein the recurring units derived from vinylidene fluoride (VDF) are the complement to 100% by moles of total recurring units.

6. The secondary battery according to claim 1, wherein the separator is a porous separator.

7. The secondary battery according to claim 6, wherein the porous separator is a microporous flat-sheet membrane or a non-woven cloth.

8. The secondary battery according to claim 1, wherein the separator is a dense separator.

9. The secondary battery according to claim 8, wherein the dense separator is a polymer electrolyte wherein at least one polymer (F) is swollen by a charge carrying medium.

* * * * *